United States Patent
Shimano

(10) Patent No.: US 10,423,002 B2
(45) Date of Patent: Sep. 24, 2019

(54) IMAGING APPARATUS CAPABLE OF GENERATING AN IMAGE USING MOIRE WITHOUT A LENS

(71) Applicant: MAXELL, LTD., Otokuni-gun, Kyoto (JP)

(72) Inventor: Takeshi Shimano, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/580,039

(22) PCT Filed: Jun. 17, 2015

(86) PCT No.: PCT/JP2015/067454
§ 371 (c)(1),
(2) Date: Dec. 6, 2017

(87) PCT Pub. No.: WO2016/203573
PCT Pub. Date: Dec. 22, 2016

(65) Prior Publication Data
US 2018/0136480 A1    May 17, 2018

(51) Int. Cl.
*G02B 27/42*    (2006.01)
*H04N 5/232*    (2006.01)
(Continued)

(52) U.S. Cl.
CPC ....... *G02B 27/4205* (2013.01); *G02B 5/1823* (2013.01); *G02B 27/4272* (2013.01);
(Continued)

(58) Field of Classification Search
CPC .. G02B 27/4205; G02B 5/1823; G03B 41/00; G03B 15/00; H04N 5/232
See application file for complete search history.

(56) References Cited

U.S. PATENT DOCUMENTS 8,558,182 B2 *  10/2013  Chi .............. H04N 5/2254
                                              250/336.1
9,442,228 B2 *   9/2016  Gill ............. G02B 5/1842
(Continued)

FOREIGN PATENT DOCUMENTS

| JP | 2008-542863 A | 11/2008 |
| JP | 2011-515675 A | 5/2011 |
| JP | 2014-050761 A | 3/2014 |

OTHER PUBLICATIONS

International Search Report of PCT/JP2015/067454 dated Sep. 15, 2015.

*Primary Examiner* — Padma Haliyur
(74) *Attorney, Agent, or Firm* — Mattingly & Malur, PC

(57) ABSTRACT

The cost and power consumption of an imaging apparatus are reduced by facilitating detection of an incident angle of a light beam transmitted through a grating substrate. An image sensor converts an optical image captured by pixels arranged on an imaging surface and outputs the converted image signal. A modulator is configured to modulate intensity of light; and an image processing circuit performs image processing of the output image signal. The modulator has a grating substrate, a grating pattern formed on a back surface side of the grating substrate arranged in proximity to the light receiving surface of the image sensor; and a grating pattern formed on a front surface facing the back surface. Each of the grating patterns is constituted of concentric circles. The modulator performs intensity modulation on the light transmitted through the grating pattern and outputs the modulated light to the image sensor.

13 Claims, 12 Drawing Sheets

(51) Int. Cl.
*G02B 5/18* (2006.01)
*G03B 15/00* (2006.01)
*G03B 41/00* (2006.01)
*H04N 5/335* (2011.01)

(52) U.S. Cl.
CPC ............ *G03B 15/00* (2013.01); *G03B 41/00* (2013.01); *H04N 5/232* (2013.01); *H04N 5/335* (2013.01)

(56) References Cited

U.S. PATENT DOCUMENTS

| | | |
|---|---|---|
| 2009/0095912 A1 | 4/2009 | Slinger et al. |
| 2010/0166293 A1 | 7/2010 | Sugita et al. |
| 2011/0007306 A1 | 1/2011 | Jak et al. |
| 2012/0091372 A1* | 4/2012 | Molnar ............ G02B 27/4205 250/550 |
| 2014/0253781 A1 | 9/2014 | Gill et al. |

* cited by examiner

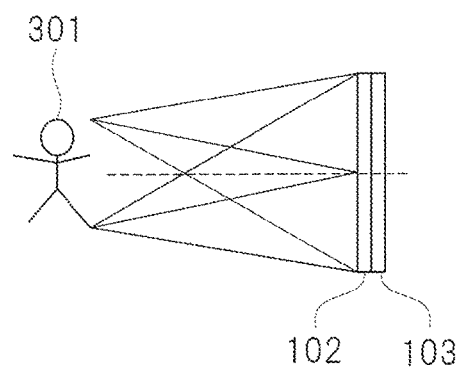
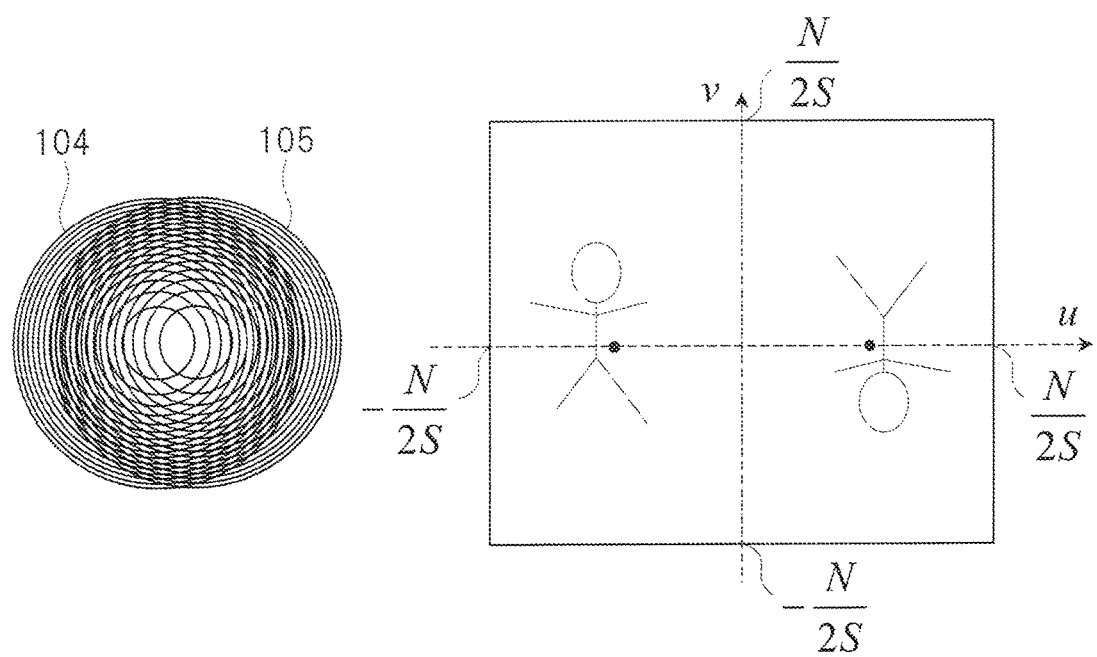

IMAGING APPARATUS CAPABLE OF GENERATING AN IMAGE USING MOIRE WITHOUT A LENS

TECHNICAL FIELD

The present invention relates to an imaging apparatus, and particularly relates to a technique effective for enhancing performance of the imaging apparatus.

BACKGROUND ART

There is a demand for a thinner digital camera to be mounted on a smartphone or the like. Examples of the technique for realizing this type of thinner digital camera include a technique that obtains an object image without using a lens (see, for example, Patent Document 1).

This technique obtains an image of an external object by attaching a special diffraction grating substrate to an image sensor and obtaining an incident angle of incident light by the inverse problem calculation on the basis of a projection pattern generated on the image sensor by light transmitted through the diffraction grating substrate.

RELATED ART DOCUMENTS

Patent Documents

Patent Document 1: US Patent Application Publication No. 2014/0253781

SUMMARY OF THE INVENTION

Problems to be Solved by the Invention

In the above-described Patent Document 1, the diffraction grating pattern formed on an upper surface of the substrate to be attached to the image sensor is a special grating pattern such as a spiral pattern, and an image of an object is obtained by solving an inverse problem for reproducing the image based on the projection pattern received by the image sensor. However, there is a problem of complication of calculation for solving the inverse problem.

If the calculation is complicated, the processing time naturally becomes long, so that it takes a long time to display the image. A high-performance CPU or the like needs to be used in order to perform calculation processing at high speed, but in that case, problems such as high cost of the digital camera and an increase in power consumption may arise.

An object of the present invention is to provide a technique capable of reducing the cost and power consumption of an imaging apparatus by facilitating detection of an incident angle of a light beam transmitted through a grating substrate.

The above and other objects and novel features of the present invention will become apparent from the description of the present specification and the accompanying drawings.

Means for Solving the Problems

An outline of representative inventions disclosed in the present application will be briefly described as follows.

That is, a typical imaging apparatus includes an image sensor, a modulator, and an image processing unit. The image sensor converts an optical image captured by a plurality of pixels arranged in an array on an imaging surface into an image signal and outputs the converted image signal. The modulator is provided on a light receiving surface of the image sensor and modulates intensity of light. The image processing unit performs image processing on the image signal output from the image sensor.

Moreover, the modulator includes a grating substrate, a first grating pattern, and a second grating pattern. The first grating pattern is formed on a first surface of the grating substrate arranged in proximity to the light receiving surface of the image sensor. The second grating pattern is formed on a second surface facing the first surface.

Each of the first grating pattern and the second grating pattern is constituted of a plurality of concentric circles. The modulator performs intensity modulation on light transmitted through the second grating pattern by the first grating pattern and outputs the modulated light to the image sensor.

In particular, the plurality of concentric circles in each of the first grating pattern and the second grating pattern are formed from a plurality of concentric circles in which a pitch of the concentric circles becomes finer in inverse proportion relative to a reference coordinate serving as a center of the concentric circles. The pitch of the plurality of concentric circles becomes finer in inverse proportion relative to the reference coordinate serving as the center of the concentric circles.

Effects of the Invention

Effects obtained by a representative invention among the inventions disclosed in the present application will be briefly described as follows.

(1) Processing time before obtaining an object image can be shortened.

(2) Hardware cost of the imaging apparatus can be reduced.

BRIEF DESCRIPTIONS OF THE DRAWINGS

FIG. 10 is an explanatory diagram for describing an angle formed by a light ray from each of points constituting an object with respect to an image sensor;

FIG. 11 is an explanatory diagram showing an example of a spatial frequency spectrum in a case where the grating patterns are mutually shifted in a horizontal direction;

DETAILED DESCRIPTION OF PREFERRED EMBODIMENTS

Figure 1:
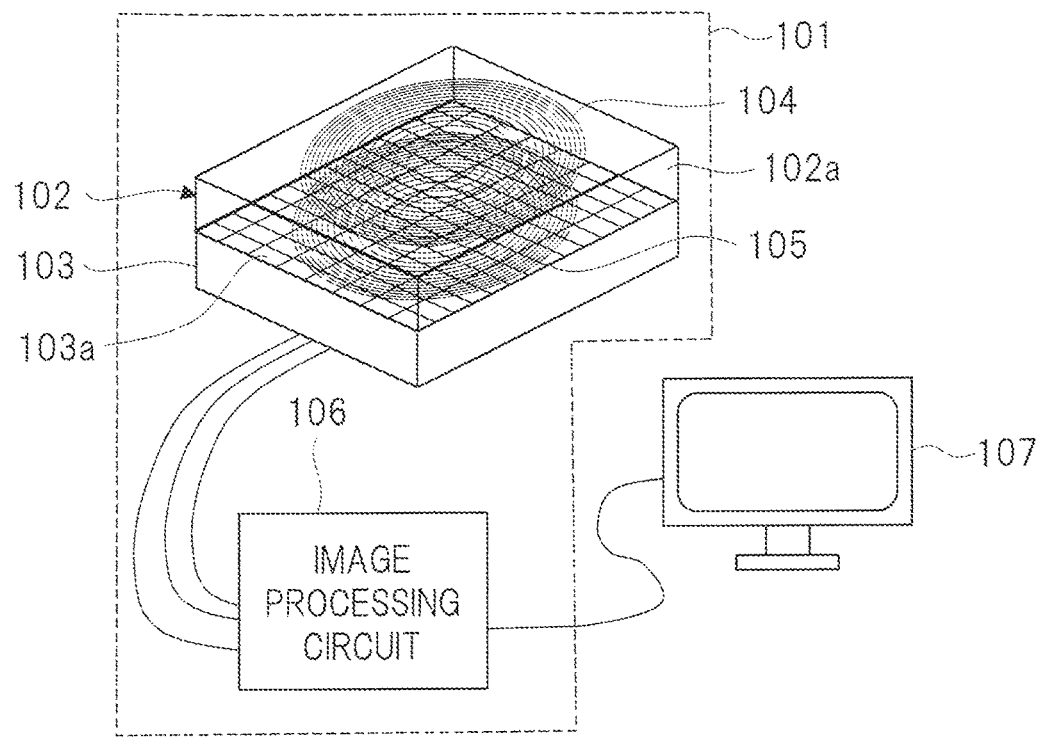
FIG. 1 is an explanatory diagram showing an example of a configuration in an imaging apparatus according to a first embodiment.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, components having the same function are denoted by the same reference characters in principle throughout the drawings for describing the embodiments, and the repetitive description thereof is omitted. Hereinafter, embodiments will be described in detail.

(First Embodiment)

<Configuration Example of Imaging Apparatus>

FIG. 1 is an explanatory diagram showing an example of a configuration of an imaging apparatus 101 according to a first embodiment.

The imaging apparatus 101 is configured to obtain an image of an external object without using an imaging lens and includes a modulator 102, an image sensor 103, and an image processing circuit 106 as shown in FIG. 1.

The modulator 102 is fixed in close contact with a light receiving surface of the image sensor 103, and has a configuration in which each of grating patterns 104 and 105 is formed on a grating substrate 102a. The grating substrate 102a is made of a transparent material such as glass or plastic.

In the modulator 102, the grating pattern 104 serving as a second grating pattern is formed on a front surface of the grating substrate 102a. Also, the front surface of the grating substrate 102a serves as a second surface. The grating pattern 104 includes concentric grating patterns in which an interval of the grating patterns, that is, a pitch of the grating patterns becomes narrower in inverse proportion to a radius from a center to an outer side.

In addition, the grating pattern 105 serving as a first grating pattern is formed on a back surface of the grating substrate 102a, that is, the surface on the side in contact with the light receiving surface of the image sensor 103. The back surface of the grating substrate 102a serves as a first surface.

Similarly to the grating pattern 104, the grating pattern 105 also includes concentric grating patterns in which a pitch of the grating patterns becomes narrower in inverse proportion to the radius from the center to the outer side.

The grating pattern 104 and the grating pattern 105 are formed by, for example, depositing aluminum or the like by the sputtering method or the like used for a semiconductor process. Shading is given by a pattern having aluminum deposited therein and a pattern having no aluminum deposited therein.

Note that formation of the grating patterns 104 and 105 is not limited to this, and the grating patterns 104 and 105 may be formed by giving the shading by, for example, printing with an inkjet printer or the like.

The intensity of the light transmitted through the grating patterns 104 and 105 is modulated by each of the grating patterns. The transmitted light is received by the image sensor 103. The image sensor 103 is constituted of, for example, a CCD (Charge Coupled Device) image sensor, a CMOS (Complementary Metal Oxide Semiconductor) image sensor, or the like.

On the front surface of the image sensor 103, pixels 103a serving as light receiving elements are regularly arranged in a form of grating. The image sensor 103 converts an optical image received by the pixel 103a into an image signal which is an electric signal. The image signal output from the image sensor 103 is subjected to image processing by the image processing circuit 106 serving as an image processing unit, and is then output to a monitor display 107 or the like.

<Example of Photographing by Imaging Apparatus>

Figure 2:
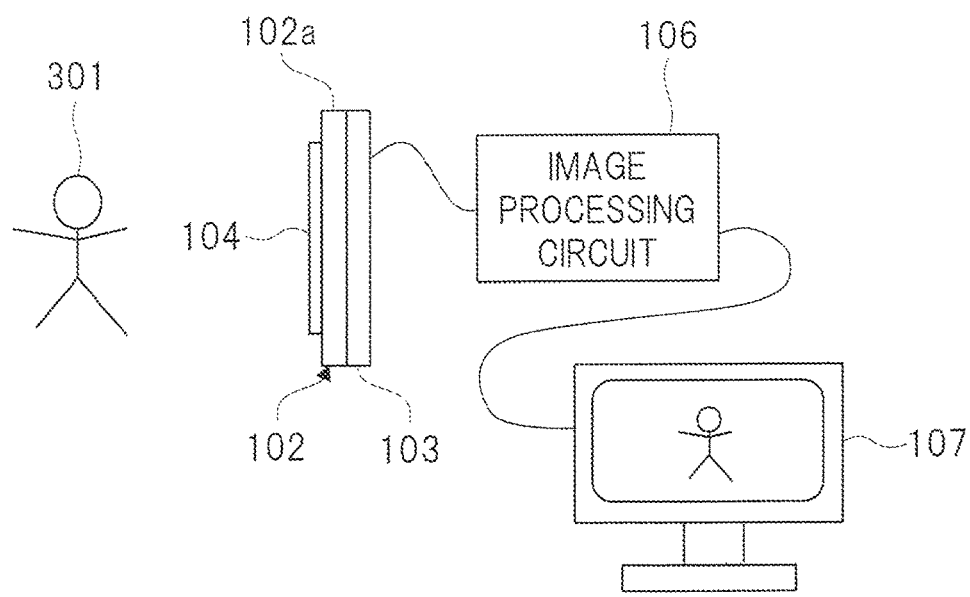
FIG. 2 is an explanatory diagram showing an example of photographing by the imaging apparatus in FIG. 1.

FIG. 2 is an explanatory diagram showing an example of photographing by the imaging apparatus 101 in FIG. 1. FIG. 2 shows an example in which a subject 301 is photographed by the imaging apparatus 101 and is displayed on the monitor display 107.

As shown in the figure, photographing of the subject 301 is performed in a state where one surface of the modulator 102, namely, the front surface of the grating substrate 102a on which the grating pattern 104 is formed directly faces the subject 301.

<Example of Image Processing of Image Processing Circuit>

Subsequently, an outline of image processing by the image processing circuit 106 will be described.

Figure 3:
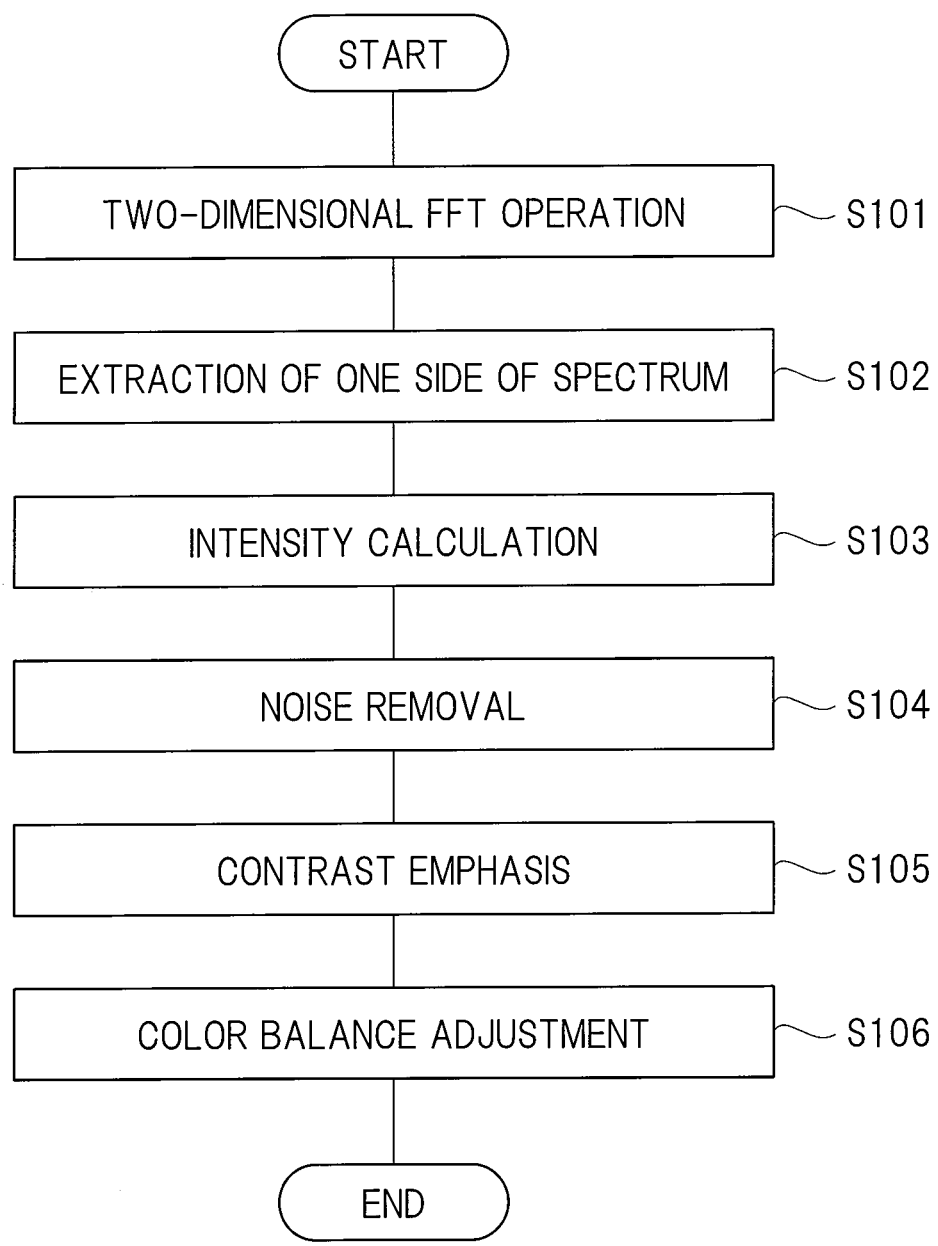
FIG. 3 is a flowchart showing an outline of image processing by an image processing circuit included in the imaging apparatus in FIG. 1.

FIG. 3 is a flowchart showing an outline of the image processing by the image processing circuit 106 included in the imaging apparatus 101 in FIG. 1.

First, for a moire fringe image output from the image sensor 103, two-dimensional FFT (Fast Fourier Transform) operation is performed for each of color RGB (Red Green Blue) components, thereby obtaining a frequency spectrum (step S101).

Subsequently, frequency data on one side of the frequency spectrum obtained by the processing of the step S101 is extracted (step S102), and the intensity of the frequency spectrum is calculated (step S103), thereby obtaining an image.

Then, after noise removal processing is performed on the obtained image (step S104), contrast emphasis processing (step S105) or the like is performed. Thereafter, the color balance of the image is adjusted (step S106) and the image is output as a photographed image.

In the manner described above, the image processing by the image processing circuit 106 is completed.

<Photographing Principle of Imaging Apparatus>

Subsequently, a photographing principle of the imaging apparatus 101 will be described.

First, the concentric grating patterns 104 and 105 in which the pitch becomes finer in inverse proportion to the radius from the center are defined as follows. Now the case where a spherical wave close to a plane wave and a plane wave used as reference light are caused to interfere with each other in a laser interferometer or the like is assumed.

When the radius from a reference coordinate serving as the center of the concentric circles is r and a phase of the spherical wave at that point is $\phi(r)$, the phase of the spherical wave can be represented by the Expression (1) below by using a coefficient $\beta$ which determines the magnitude of the curvature of a wavefront.

[Expression 1]

$$\phi(r)=\beta r^2 \quad (1)$$

The reason why the phase is represented by the square of the radius r in spite of a spherical wave is that the wave is a spherical wave close to a plane wave, and thus approximation is possible solely by the lowest order of expansion. When plane waves are caused to interfere with the light having this phase distribution, the intensity distribution of the interference fringes represented by the Expression (2) is obtained.

[Expression 2]

$$I(r) = \frac{1}{4}|\exp i\phi(r) + 1|^2 \quad (2)$$
$$= \frac{1}{2}(1 + \cos\phi)$$
$$= \frac{1}{2}(1 + \cos\beta r^2)$$

This corresponds to a fringe of concentric circles having a bright line at a radial position that satisfies the Expression (3)

[Expression 3]

$$\phi(r)=\beta r^2=2n\pi \; (n=0,1,2,\ldots) \quad (3)$$

When the pitch of the fringe is p, the following Expression (4) is obtained, and it can be seen that the pitch becomes narrower in inverse proportion to the radius.

[Expression 4]

$$p\frac{d}{dr}\phi(r) = 2p\beta r = 2\pi \quad (4)$$
$$p(r) = \frac{\pi}{\beta r}$$

Such a fringe is referred to as Fresnel zone plate. The grating pattern having a transmittance distribution proportional to the intensity distribution defined in this manner is used as the grating patterns 104 and 105 shown in FIG. 1.

Figure 4:
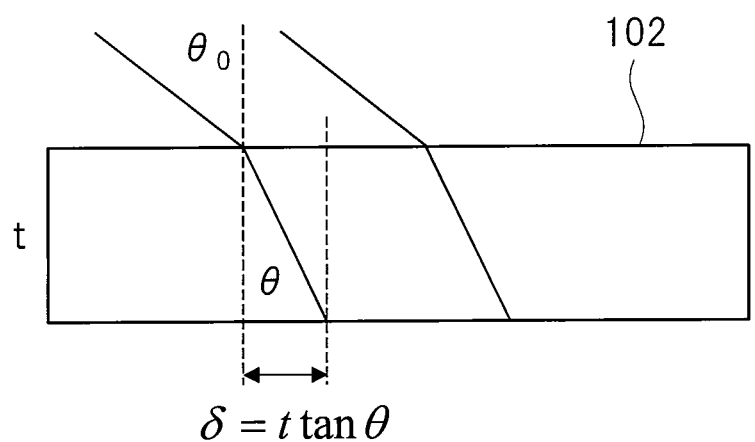
FIG. 4 is an explanatory diagram showing an example of in-plane shift of a projection image from a front surface to a back surface of a double-sided grating substrate by an oblique incident parallel ray.

Now the case where a parallel ray is incident at an angle θ0 on the modulator 102 with a thickness t having such a grating pattern formed on both surfaces as shown in FIG. 4 is assumed. When a refraction angle in the modulator 102 is θ, light multiplied by the transmittance of the grating of the front surface is incident on the back surface while being shifted by δ=t·tan θ in terms of geometrical optics, and if the centers of the two concentric gratings are formed to be aligned with each other, the transmittance of the grating of the back surface is multiplied while being shifted by δ.

At this time, intensity distribution as represented by the following Expression (5) is obtained.

[Expression 5]

$$I(x,y)I(x+\delta,y) = \frac{1}{4}\{1 + \cos\beta(x^2+y^2)\}\{1 + \cos\beta((x+\delta)^2+y^2)\} \quad (5)$$
$$= \frac{1}{8}\{2 + 4\cos\beta(r^2+\delta x)\cos\delta\beta x +$$
$$\cos2\beta(r^2+\delta x) + \cos2\beta\delta x\}$$

It can be seen that the fourth term of this expansion expression forms fringe patterns, which are equally spaced and straight in a direction of the shift of the two gratings, over a whole overlapped region. The fringes generated at a relatively low spatial frequency due to the overlapping of the fringes are referred to as moire fringes.

These equally spaced and straight fringes generate a sharp peak in the spatial frequency distribution obtained by two-dimensional Fourier transform of the detected image. A value of δ, that is, an incident angle θ of the light beam can be obtained from the frequency value.

It is obvious that such equally spaced moire fringes uniformly obtained on the whole surface are generated at the same pitch regardless of the direction of shift because of the symmetry of the concentric grating arrangement. These fringes can be obtained because the grating pattern is formed of the Fresnel zone plate, and it is considered that it is not possible to obtain uniform fringes on a whole surface by other grating patterns.

It can be seen that the second term also generates fringes in which the intensity of the Fresnel zone plate is modulated by moire fringes. In this case, however, since the frequency spectrum of the product of the two fringes is a convolution of each of Fourier spectra, no sharp peak is obtained.

When a component having a sharp peak is selectively extracted from the Expression (5) as shown in the Expression (6), the Fourier spectrum thereof is as shown in the Expression (7).

[Expression 6]

$$I(x, y) = \frac{1}{8}(2 + \cos 2\delta\beta x) \tag{6}$$

[Expression 7]

$$F[I(x, y)] = \frac{1}{8}F[2 + \cos 2\delta\beta x] \tag{7}$$
$$= \frac{1}{4}\delta(u, v) + \frac{1}{8}\delta\left(u + \frac{\delta\beta}{\pi}, v\right) + \frac{1}{8}\delta\left(u - \frac{\delta\beta}{\pi}, v\right)$$

Note that F represents Fourier transform operation, u and v are spatial frequency coordinates in the x direction and the y direction, and δ with parentheses is a delta function. The result indicates that the peak of the spatial frequency of moire fringes is generated at a position of u=±δβ/π in the spatial frequency spectrum of the detected image.

Figure 5:
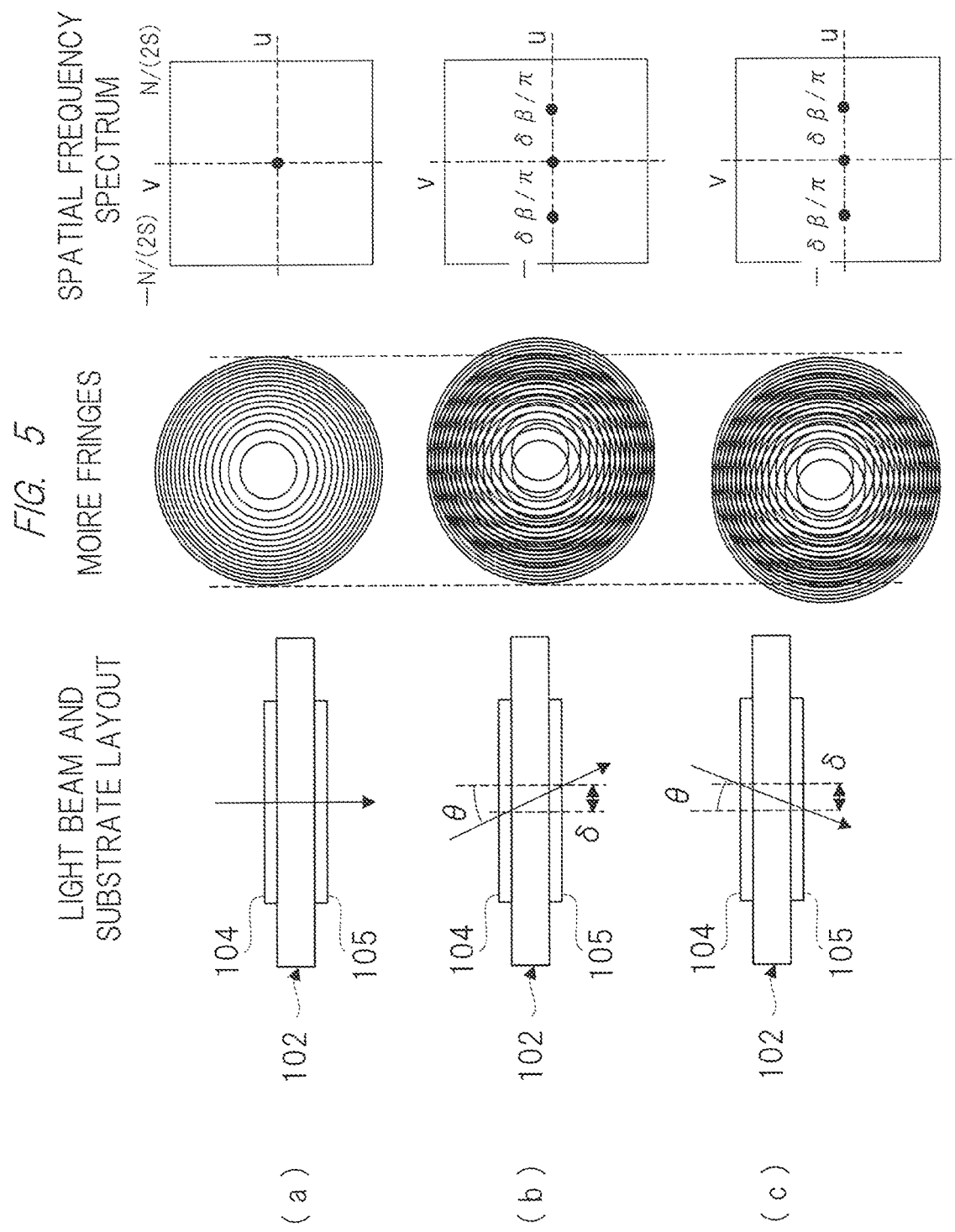
FIG. 5 is a schematic diagram for describing generation of a moire fringe and a frequency spectrum in a case where the axes of the grating patterns of the double-sided grating substrate are aligned.

This state is shown in FIG. 5. In FIG. 5, layout diagrams of the light beam and the modulator 102, diagrams of the moire fringes, and schematic diagrams of the spatial frequency spectrum are shown in the order from the left to the right. Specifically, FIG. 5(a) shows a case of normal incidence, FIG. 5(b) shows a case where a light beam is incident from the left side at an angle θ, and FIG. 5(c) shows a case where a light beam is incident from the right side at the angle θ.

The grating pattern 104 formed on the front surface side of the modulator 102 and the grating pattern 105 formed on the back surface side are coaxially arranged. In FIG. 5(a), since the shadow of the grating pattern 104 and the shadow of the grating pattern 105 coincide with each other, moire fringes are not generated.

In FIGS. 5(b) and 5(c), the same moire is generated because the shift of the grating pattern 104 and the grating pattern 105 is equal, and peak positions of the spatial frequency spectrum also coincide with each other. As a result, it is not possible to determine whether the incident angle of the light beam is as shown in FIG. 5(b) or as shown in FIG. 5(c), from the spatial frequency spectrum.

Figure 6:
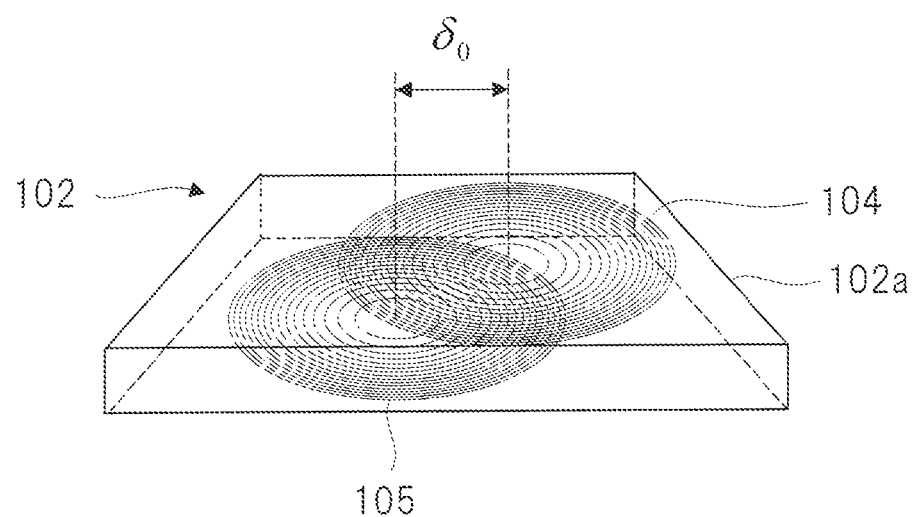
FIG. 6 is an explanatory diagram showing an example of a double-sided grating substrate formed by shifting axes of a grating pattern on the front surface side and a grating pattern on the back surface side.

In order to avoid this, it is necessary to arrange the two grating patterns 104 and 105 so as to be shifted relative to the optical axis beforehand as shown in FIG. 6 such that the shadows of the two grating patterns are overlapped so as to be shifted with respect to the light beam perpendicularly incident on the modulator 102.

When the relative shift of the shadows of the two gratings with respect to the normal incident plane wave on the axis is δ0, a shift δ caused by the plane wave of the incident angle θ can be represented as the Expression (8).

[Expression 8]

$$\delta = \delta_0 + t \tan \theta \tag{8}$$

At this time, the peak of the spatial frequency spectrum of moire fringes of the light beam of the incident angle θ is at a position represented by the Expression (9) on the positive side of the frequency.

[Expression 9]

$$u = \frac{\delta\beta}{\pi} = \frac{1}{\pi}(\delta_0 + t\tan\theta)\beta \tag{9}$$

When the size of the image sensor is S and the number of pixels of the image sensor in each of the x direction and the y direction is N, the spatial frequency spectrum of a discrete image calculated by fast Fourier transform (FFT) is obtained in a range of −N/(2S) to +N/(2S).

Accordingly, considering that light is received equally at the incident angle on the positive side and the incident angle on the negative side, the spectral peak position of the moire fringe by the normal incident plane wave (θ=0) is reasonably determined to be located at a central position between an origin (DC: direct current component) position and a frequency position at the positive (+) side end, that is, a spatial frequency position represented by the Expression (10).

[Expression 10]

$$\frac{1}{\pi}\delta_0\beta = \frac{N}{4S} \tag{10}$$

Therefore, the relative center position shift between the two gratings is reasonably determined as represented by the Expression (11).

[Expression 11]

$$\delta_0 = \frac{\pi N}{4\beta S} \tag{11}$$

Figure 7:
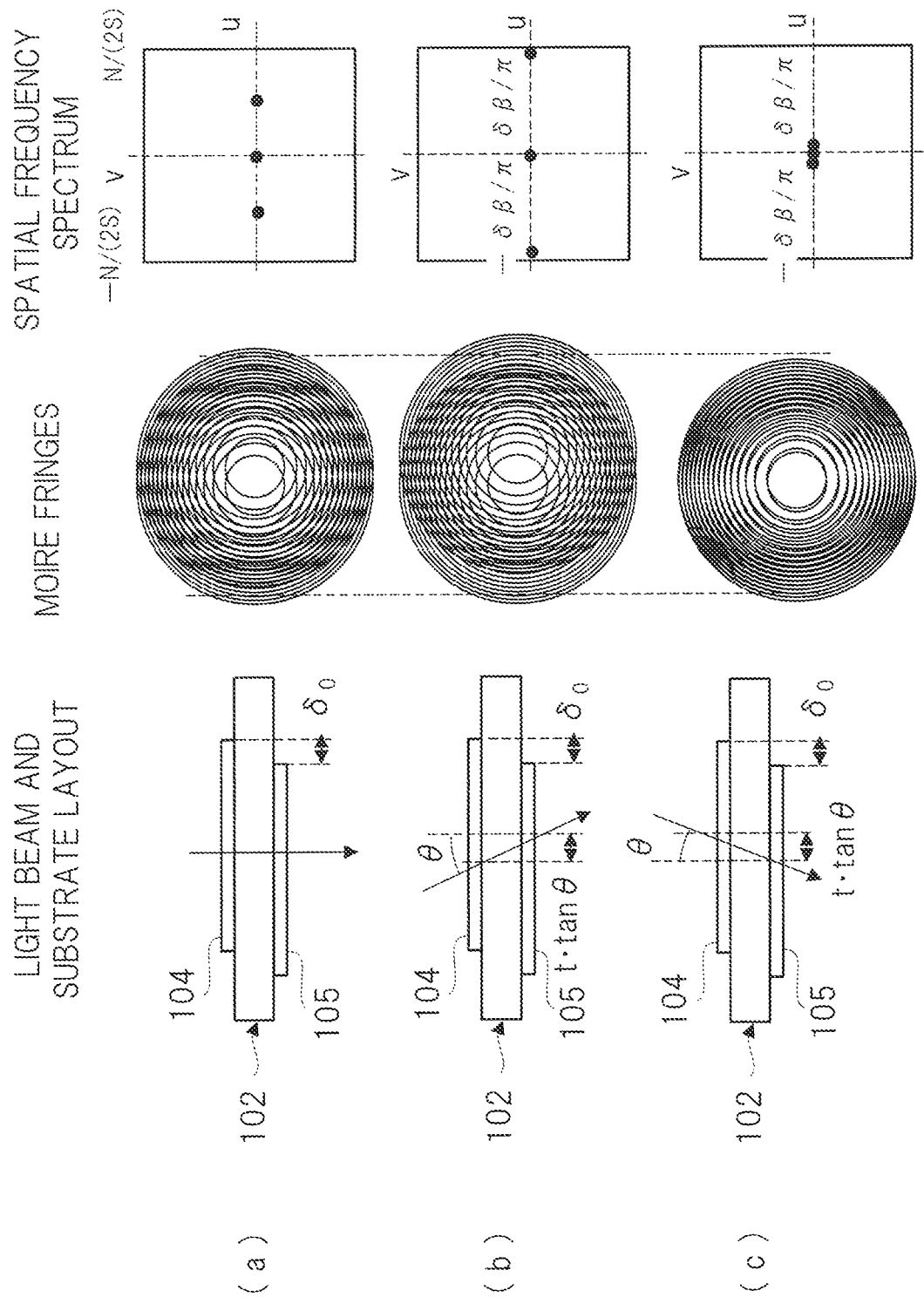
FIG. 7 is a schematic diagram for describing generation of a moire fringe and a frequency spectrum in a case where the grating patterns are arranged so as to be shifted from each other.

FIG. 7 is a schematic diagram for describing generation of a moire fringe and a frequency spectrum in a case where the grating patterns 104 and 105 are arranged so as to be shifted from each other.

Similarly to FIG. 5, layout diagrams of the light beam and the modulator 102 are shown on the left side, diagrams of moire fringes are shown at the middle, and schematic diagrams of the spatial frequency spectrum are shown on the right side. In addition, FIG. 7(a) is a case where the light beam is a normal incident beam, FIG. 7(b) shows a case where the light beam is incident from the left side at an angle θ, and FIG. 7(c) is a case where the light beam is incident from the right side at the angle θ.

The grating pattern 104 and the grating pattern 105 are arranged to be shifted from each other by δ0 in advance. Therefore, moire fringes are generated also in FIG. 7(a), and a peak appears in the spatial frequency spectrum.

As described above, the shift amount δ0 is set such that a peak position appears at a center of the spectral range on one side from the origin. At this time, since the shift δ increases in FIG. 7(b) and the shift δ decreases in FIG. 7(c), a difference between FIG. 7(b) and FIG. 7(c) can be determined from the peak position of the spectrum unlike FIG. 5.

The spectral image of this peak is a bright point indicating a light flux at infinity, which is nothing but a photographed image by the imaging apparatus 101 in FIG. 1.

When the maximum incident angle of the parallel ray that can be received is θmax, the maximum angle of view that can be received by the imaging apparatus 101 is given by the Expression (13) on the basis of the Expression (12).

[Expression 12]

$$u_{max} = \frac{1}{\pi}(\delta_0 + t\tan\theta_{max})\beta = \frac{N}{2S} \quad (12)$$

[Expression 13]

$$\tan\theta_{max} = \frac{\pi N}{4t\beta S} \quad (13)$$

By analogy with the conventional image formation using a lens, in a case where a parallel ray with the angle of view of θmax is received by focusing at the end of the image sensor, the effective focal length of the imaging apparatus 101 using no lens can be considered to correspond to the Expression (14).

[Expression 14]

$$f_{\mathit{eff}} = \frac{S}{2\tan\theta_{max}} = \frac{2\beta tS^2}{\pi N} \quad (14)$$

As indicated by the expression (2), the transmittance distribution of the grating pattern fundamentally assumes a sinusoidal characteristic, and if such a component is present as a fundamental frequency component of the grating pattern, it is also conceivable to enhance the transmittance by binarizing the transmittance of the grating pattern and changing the duty between the grating region having high transmittance and the grating region having low transmittance so as to expand the width of the high transmittance region.

Although incident light beam has just one simultaneous incident angle in the above description, it is necessary to assume a case where light rays having a plurality of incident angles are simultaneously incident, in order to cause the imaging apparatus 101 to actually operate as a camera.

Such light rays having a plurality of incident angles would cause a plurality of images of the front side grating to be overlapped at the time of the incidence on the grating pattern on the back surface side. If these mutually generate moire fringes, there would be a concern of generating noise that might hinder detection of moire fringes with the grating pattern 105 which is a signal component.

In practice, however, the overlapping of the images of the grating pattern 104 generates no peak of the moire image, and solely the overlapping with the grating pattern 105 on the back surface side generates the peak.

The reason will be described below.

First, a large difference is that the overlapping of the shadows of the grating pattern 104 on the front surface side by the light beams at a plurality of incident angles is not a product but a sum. In the overlapping of the shadow of the grating pattern 104 by the light at one incident angle and the grating pattern 105, the light intensity distribution after transmission through the grating pattern 105 on the back surface side is obtained by multiplying the intensity distribution of the light corresponding to the shadow of the grating pattern 104 by the transmittance of the grating pattern 105.

In contrast, since the overlapping of the shadows caused by a plurality of light rays having different incident angles to be incident on the grating pattern 104 on the front surface side is the overlapping of the light rays, it is not a product but a sum. In the case of sum, the distribution obtained by multiplying the distribution of the grating of the original Fresnel zone plate by the distribution of moire fringes is generated as represented in the Expression (15).

[Expression 15]

$$I(x, y) + I(x + \delta, y) = \frac{1}{2}\{1 + \cos\beta(x^2 + y^2)\} + \\ \frac{1}{2}\{1 + \cos\beta((x+\delta)^2 + y^2)\} \\ = 1 + \cos\beta(r^2 + \delta x)\cos\delta\beta x \quad (15)$$

Accordingly, the frequency spectrum thereof is represented by the overlap integral of each of the frequency spectra. Therefore, even when the single moire spectrum has a sharp peak, merely ghosting of the frequency spectrum of the Fresnel zone plate would occur at that position in practice. Namely, no sharp peak is generated in the spectrum.

Accordingly, the spectrum of the moire image to be detected even when the light rays having a plurality of incident angles are incident is constantly the moire of the product of the grating pattern 104 on the front surface side and the grating pattern 105 on the back surface side alone, and the number of peaks of the spectrum to be detected is solely one for one incident angle as long as the grating pattern 105 is single.

<Confirmation of Photographing Principle>

Figure 8:
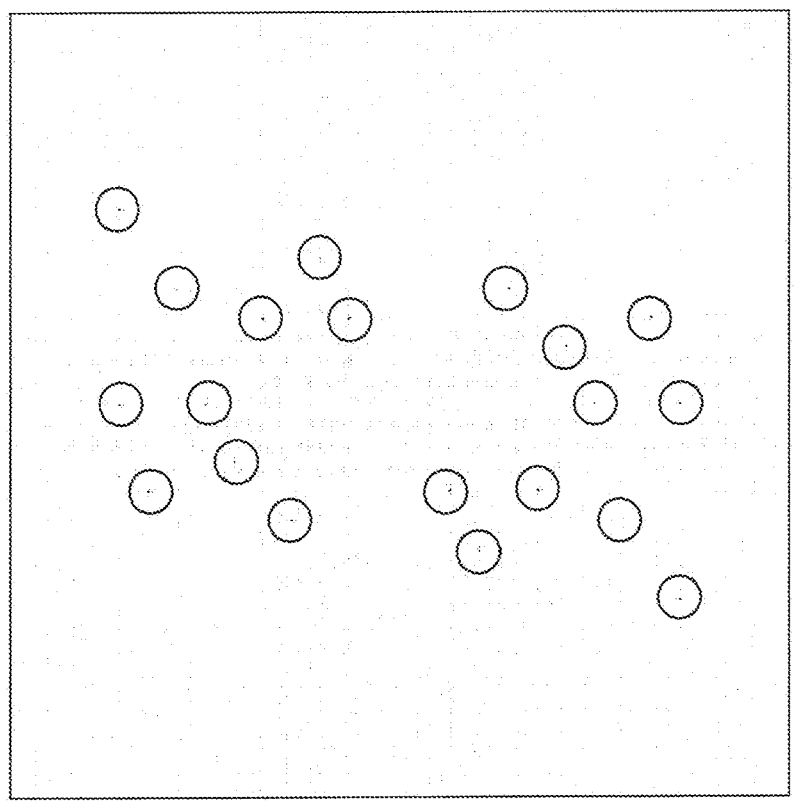
FIG. 8 is an explanatory diagram showing a calculation result of a spatial frequency spectral image when being irradiated with a total of ten light rays including a normal incident plane wave and other nine plane waves with different incident angles.
Figure 9:
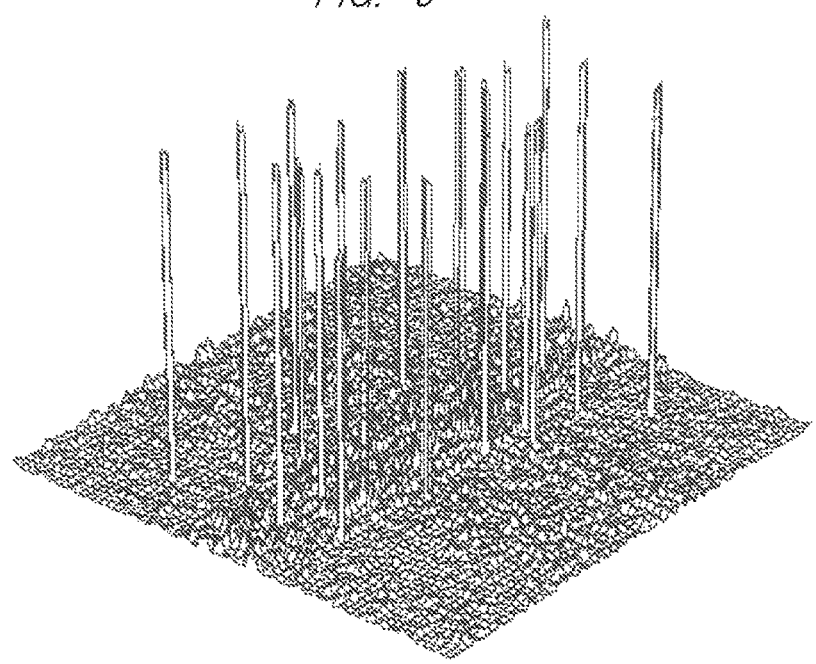
FIG. 9 is a bird's-eye view showing a calculation result of a spatial frequency spectral image when being irradiated with a total of ten light rays including a normal incident plane wave and other nine plane waves with different incident angles.

Hereinafter, results of a simulation performed to confirm the principle are shown in FIGS. 8 and 9. FIG. 8 is an explanatory diagram showing a calculation result of a spatial frequency spectral image when being irradiated with a total of ten light rays including a normal incident plane wave and other nine plane waves with different incident angles. FIG. 9 is a bird's-eye view showing a calculation result of a spatial frequency spectral image when being irradiated with a total of ten light rays including a normal incident plane wave and other nine plane waves with different incident angles.

Both figures show a spectrum in a case where a total of 10 plane waves including a normal incident plane wave, incident light with θx=50° and θy=30°, incident light with θx=−30° and θy=70°, incident light with θx=10° and θy=−20°, incident light with θx=20° and θy=30°, incident light with θx=30° and θy=−40°, incident light with θx=−10° and θy=40°, incident light with θx=−20° and θy=−30°, incident light with θx=−30° and θy=0°, and incident light with θx=40° and θy=50° are incident under the conditions that the sensor size of the image sensor 103 is 20 mm square, the viewing angle θmax=±70°, grating coefficient β on the incident side and emission side=50 (rad/mm2), δ0=0.8 mm, the number of pixels is 1024×1024, the substrate thickness at the modulator 102 is 1 mm, and the substrate refractive index is 1.5.

FIG. 8 is a black and white inverted image of the spectral image, and FIG. 9 is a bird's-eye view showing the luminance of the spectral image. The original moire image itself is omitted because the grating pitch is too thin to be visually recognized even when it is displayed in the drawing of the present specification.

In the figure, the whole area of a spatial frequency spectral region in which the center indicates a DC component and the periphery indicates ±N/2S is displayed. The DC component has a large value and is thus removed by masking, and solely the peak component to be detected is displayed. Furthermore, since the original peak width of the spectrum is too narrow to be visually recognized, contrast is emphasized.

In addition, in FIG. 8, the positions of the signal peaks are indicated by open circles surrounding the positions. In the bird's-eye view of FIG. 9, since the drawn line does not pass through the peak and thus cannot be displayed as it is, a result obtained by applying an averaging filter of the mesh size is displayed.

Both figures basically show that 10 peaks can be detected as a total of 20 peaks on both of positive and negative sides across the origin. In this case, the pitch of the outermost periphery of the grating pattern is about 6 μm and the effective focal length is about 12.4 mm.

Now, the correspondence between the parallel ray to be detected which has been described so far and the light from the actual object will be described schematically with reference to FIG. 10.

FIG. 10 is an explanatory diagram for describing an angle formed by a light ray from each of points constituting an object with respect to an image sensor.

Strictly speaking, the rays from respective points constituting the subject 301 are incident as spherical waves from a point light source on the modulator 102 and the image sensor 103 (hereinafter referred to as a grating sensor integrated substrate in FIG. 10) of the imaging apparatus 101 in FIG. 1.

At this time, in a case where the grating sensor integrated substrate is sufficiently small with respect to the subject 301 or is sufficiently distant from the subject 301, the incident angles of light rays illuminating the grating sensor integrated substrate from the respective points can be regarded to be the same.

On the basis of a relationship that a spatial frequency displacement Δu of the moire with respect to a minute angular displacement Δθ obtained from the expression (9) is not more than 1/S which is the minimum resolution of the spatial frequency of the image sensor, the condition for determining Δθ as a parallel ray is represented by the Expression (16).

[Expression 16]

$$\Delta u = \frac{1}{\pi}\beta t\Delta\theta \le \frac{1}{S}$$
$$\Delta\theta \le \frac{\pi}{s\beta t}$$
(16)

Accordingly, if Δθ<0.18°, this condition can be realized when a sensor size is 20 mm and a distance from the subject is 6 m.

By analogy with the above results, it can be seen that the imaging apparatus of the present invention is capable of the image formation of an object at infinity.

As described above, an image of an external object can be obtained by simple operation such as fast Fourier transform (FFT). Accordingly, it is possible to shorten the processing time before obtaining an object image.

Moreover, since there is no need to use a high-performance calculation processing apparatus, it is possible to reduce the hardware cost of the imaging apparatus 101. Furthermore, since the calculation processing time is shortened, it is possible to reduce the power consumption of the imaging apparatus 101.

(Second Embodiment)
<Overview>

Although the case where an image output from the imaging apparatus 101 is vertically long has been described in the first embodiment above, the case where the output image is horizontally long will be described in the second embodiment.

In the first embodiment, as described above, the grating pattern 104 and the grating pattern 105 are formed so as to be shifted from each other in the x direction (horizontal direction) of the image sensor 103. In other words, the grating pattern 104 and the grating pattern 105 are formed so as to be shifted in a long side direction of a rectangular image output from the image processing circuit 106.

<Example of Formation of Grating Pattern>

FIG. 11 is an explanatory diagram showing an example of a spatial frequency spectrum in a case where the grating patterns 104 and 105 are mutually shifted in the horizontal direction.

At this time, the shape of the image sensor 103 is assumed to be a square, and a pixel pitch thereof is equal in both of the x direction and the y direction. In this case, as shown on the right side of FIG. 11, in the spatial frequency spectrum of the output of the image sensor, the image is reproduced to be separated to the left and right sides within the frequency range of ±N/S in both of the x direction and the y direction.

In the example shown in FIG. 11, however, the image is basically limited to a vertically long area. Generally, an image obtained by a digital camera or the like is a horizontally long rectangle with an aspect ratio of, for example, 3:2 or 4:3. Accordingly, as an arrangement of the grating patterns 104 and 105 suitable for the horizontally long rectangle, an example shown in FIG. 12 is desirable.

Figure 12:
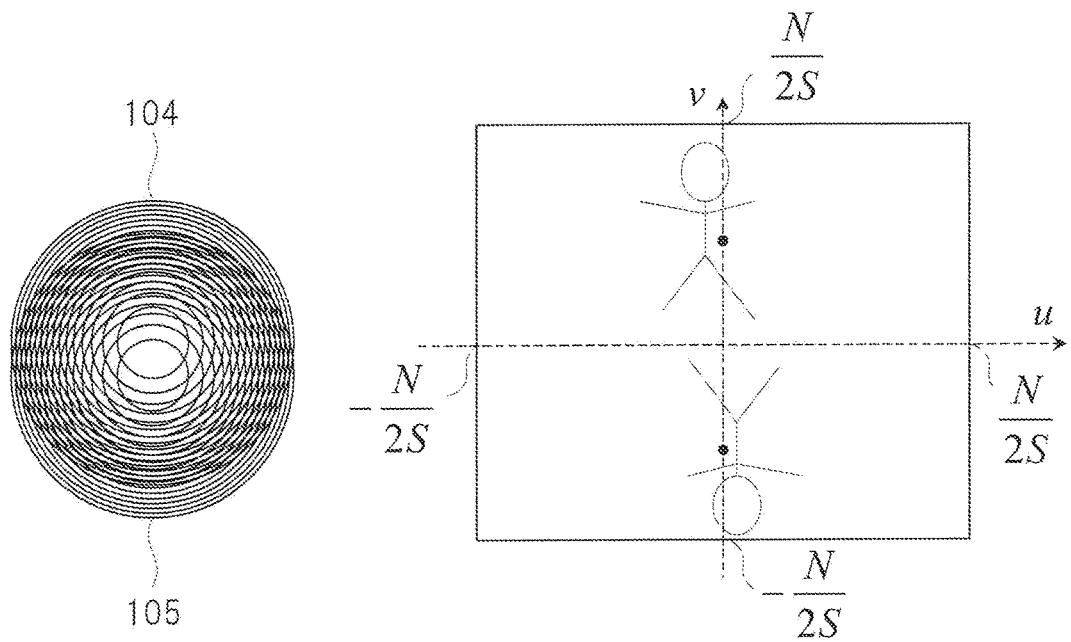
FIG. 12 is an explanatory diagram showing an example of a spatial frequency spectrum in a case where the grating patterns are mutually shifted in a vertical direction.

FIG. 12 is an explanatory diagram showing an example of a spatial frequency spectrum in a case where the grating patterns 104 and 105 are mutually shifted in the vertical direction.

As shown in FIG. 12, the grating pattern 104 and the grating pattern 105 are formed so as to be shifted in the vertical direction of the image sensor, that is, in the y direction of the image sensor. In other words, the grating pattern 104 and the grating pattern 105 are formed so as to be mutually shifted in a short side direction of a rectangular image output from the image processing circuit 106. As a result, the image formed in the spatial frequency space of the image sensor output is vertically separated as shown on the right side of FIG. 12.

As described above, it is possible to make the image output from the imaging apparatus 101 horizontally long. Therefore, since an image can be obtained in the same manner as a general digital camera, versatility of the imaging apparatus 101 can be enhanced.

(Third Embodiment)
<Overview>

In the modulator 102 according to the first and second embodiments, the grating pattern 104 and the grating pattern 105 with the same shape are formed on the front surface and the back surface of the grating substrate 102a, respectively, so as to be shifted from each other, so that an image is formed by detecting the angles of the incident parallel rays from the spatial frequency spectrum of the moire fringes.

The grating pattern 105 on the back surface side is an optical element that comes in close contact with the image sensor 103 and modulates the intensity of incident light. Therefore, by setting the sensitivity of the image sensor effectively by taking into account the transmittance of the grating pattern 105 on the back surface side, it is possible to virtually generate moire in the processed image.

<Configuration Example of Imaging Apparatus>

Figure 13:
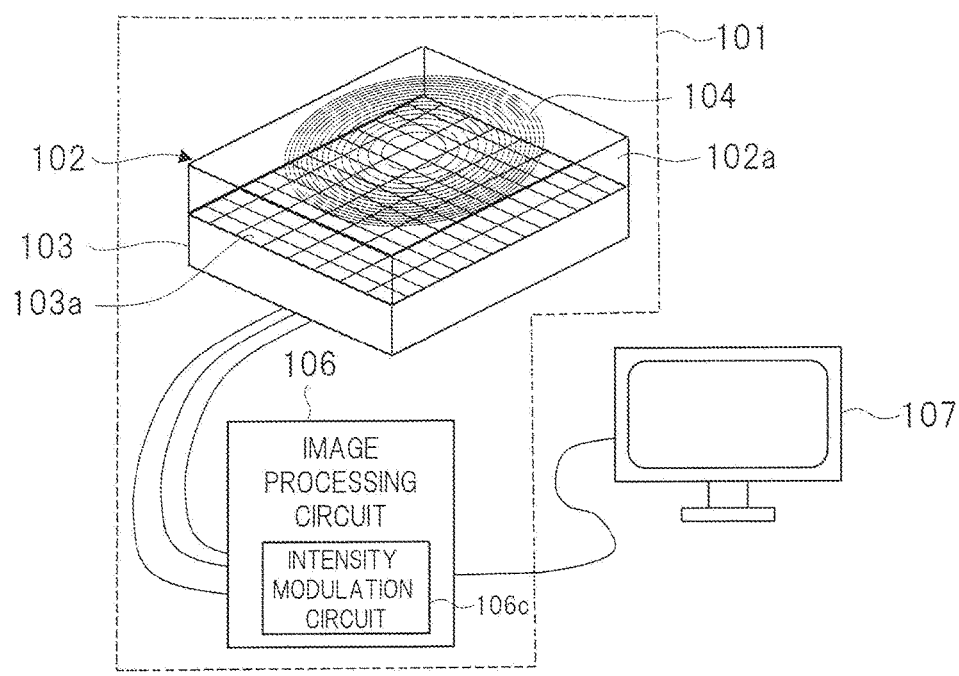
FIG. 13 is an explanatory diagram showing an example of a configuration of an imaging apparatus according to a third embodiment.

FIG. 13 is an explanatory diagram showing an example of a configuration of the imaging apparatus 101 according to a third embodiment.

The imaging apparatus 101 in FIG. 13 is different from the imaging apparatus 101 in FIG. 1 according to the first embodiment in that the grating pattern 105 shown in FIG. 1 is not formed on the back surface side of the grating substrate 102a. The other configurations are similar to those in FIG. 1, and thus the description thereof will be omitted.

By adopting the configuration shown in FIG. 13, it is possible to eliminate one grating pattern to be formed on the grating substrate 102a. This makes it possible to reduce the manufacturing cost of the modulator 102.

In this case, however, a pitch of the pixels 103a of the image sensor 103 needs to be fine enough to sufficiently reproduce the pitch of the grating pattern, or a pitch of the grating pattern needs to be rough enough to be reproduced by the pixel pitch of the image sensor 103.

In the case where a grating pattern is to be formed on both surfaces of the grating substrate 102a, it is not always necessary that the pitch of the grating pattern is resolvable by the pixel 103a of the image sensor 103, and it is only necessary that solely the moire image thereof is resolvable. Therefore, the pitch of the grating pattern can be determined independently of the pixel pitch.

However, in the case where the grating pattern is reproduced by the image sensor 103, the grating pattern and the resolution of the image sensor 103 need to be equal to each other. Therefore, an intensity modulation circuit 106c corresponding to the grating pattern 105 (FIG. 1) on the back surface side for generating moire for the output image of the image sensor 103 is provided in the image processing circuit 106.

<Example of Image Processing of Image Processing Circuit>

Figure 14:
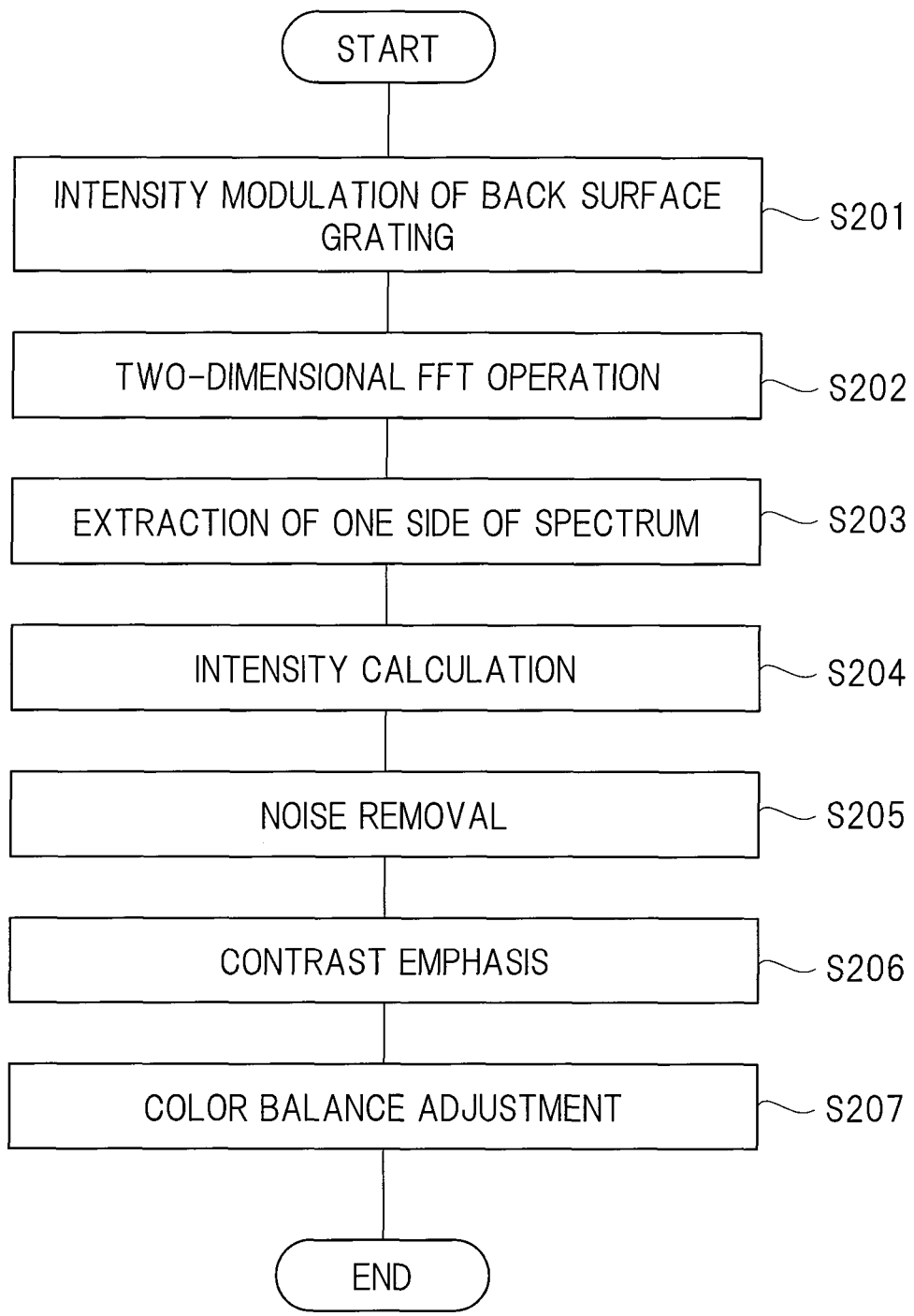
FIG. 14 is a flowchart showing an outline of image processing by an image processing circuit included in the imaging apparatus in FIG. 13.

FIG. 14 is a flowchart showing an outline of image processing by the image processing circuit 106 included in the imaging apparatus 101 in FIG. 13.

The flowchart in FIG. 14 is different from the flowchart in FIG. 3 of the first embodiment in the processing of step S201. In the processing of step S201, a moire fringe image corresponding to a grating pattern on the back surface side is generated for the image output from the image sensor 103 by the above-described intensity modulation circuit 106c.

Thereafter, the processing of steps S202 to S208 of FIG. 14 is similar to the processing of steps S101 to S107 in FIG. 3 of the first embodiment, and thus the description thereof will be omitted.

By providing the intensity modulation circuit 106c in this manner, it is possible to obtain an effect similar to the case where the grating pattern 105 on the back surface side (FIG. 1) is made variable, so that the detection light needs not necessarily be a parallel ray.

<Focusing>

Figure 15:
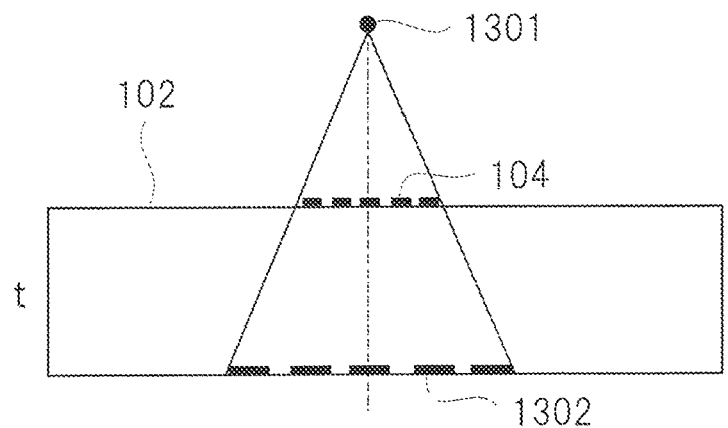
FIG. 15 is an explanatory diagram showing that projection of a grating pattern on the front surface side to the back surface is enlarged more than the original grating pattern in a case where the object to be imaged is at a finite distance.

FIG. 15 is an explanatory diagram showing that projection of the grating pattern 104 on the front surface side to the back surface is enlarged more than the grating pattern 104 in a case where the object to be imaged is at a finite distance.

As shown in FIG. 15, in a case where the grating pattern 104 on the front surface side is irradiated with a spherical wave from a point 1301 constituting an object and a shadow 1302 thereof is projected on a lower surface, the image projected on the lower surface is substantially uniformly enlarged.

Therefore, equally spaced straight moire fringes would not be generated by simply multiplying the transmittance distribution of the grating pattern on the back surface side (corresponding to the grating pattern 105 in FIG. 1) designed for the parallel ray. However, if the grating of the lower surface is enlarged in accordance with the uniformly enlarged shadow of the grating pattern 104 on the front surface side, it is possible to generate equally spaced straight moire fringes again for the enlarged shadow 1302.

Thus, it is possible to selectively reproduce the light from the point 1301 at a distance which is not necessarily at infinity. As a result, focusing becomes possible, and photographing can be performed while focusing at an arbitrary position instead of the photographing at infinity described in the first embodiment.

In the manner described above, it is possible to enhance the convenience of the imaging apparatus 101.

(Fourth Embodiment)

In a fourth embodiment, a technique for making the grating pattern 104 on the front surface side of FIG. 1 variable will be described.

<Configuration Example and Operation Example of Imaging Apparatus>

Figure 16:
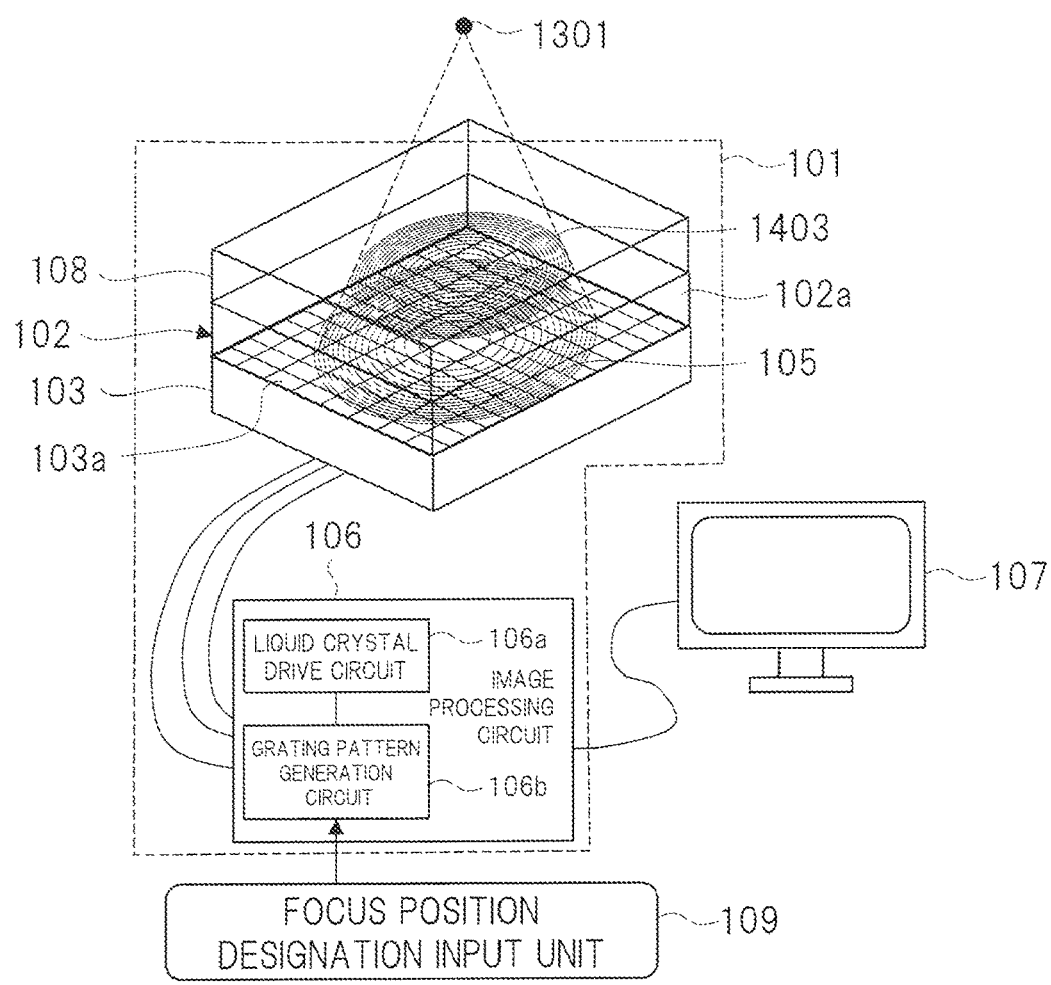
FIG. 16 is an explanatory diagram showing an example of a configuration of an imaging apparatus according to a fourth embodiment.

FIG. 16 is an explanatory diagram showing an example of a configuration of an imaging apparatus 101 according to the fourth embodiment.

The imaging apparatus 101 in FIG. 16 is different from the imaging apparatus 101 in FIG. 1 according to the first embodiment in that a liquid crystal unit 108 is newly provided in the modulator 102 and a focus position designation input unit 109 is newly provided. Note that the configuration of the image sensor 103 in FIG. 16 is similar to the configuration in FIG. 1, and thus the description thereof will be omitted.

The liquid crystal unit 108 has a configuration in which a liquid crystal layer (not shown) is provided on a glass substrate (not shown) on which a transparent electrode or the like is formed, and the liquid crystal layer is formed so as to be sandwiched between the glass substrate and the grating substrate 102a.

An arbitrary grating pattern 1403 is displayed on the liquid crystal layer, and the grating pattern 1403 serves as the grating pattern 104 on the front surface side. Similarly to the case of FIG. 1, the grating pattern 105 is formed on the back surface side of the grating substrate 102a in the modulator 102.

The focus position designation input unit 109 is an input unit which sets a focus position corresponding to information such as the distance to the subject, and is connected to the image processing circuit 106. In addition, the image processing circuit 106 includes a liquid crystal drive circuit 106a and a grating pattern generation circuit 106b.

The grating pattern generation circuit 106b generates a grating pattern optimum for focusing on the basis of the focus position input from the focus position designation input unit 109. The liquid crystal drive circuit 106a performs display control by applying a voltage to the transparent electrode formed on the glass substrate such that the grating pattern generated by the grating pattern generation circuit 106b is displayed on the liquid crystal layer of the liquid crystal unit 108.

Since the light from the finite distance point 1301 which is basically closer than infinity is divergent light, the same size as the grating pattern 105 on the back surface side can be achieved on the back surface by displaying the grating pattern 104 on the front surface side so as to be slightly smaller than the grating pattern 105.

In the manner described above, it is possible to achieve faster focusing.

(Fifth Embodiment)

In a fifth embodiment, another example of the grating pattern on the front surface side formed on the double-sided grating substrate will be described.

<Example of Formation of Grating Pattern>

Figure 17:
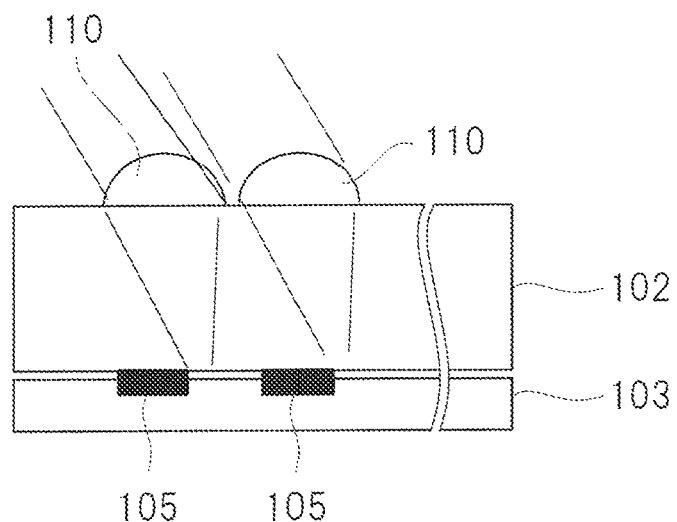
FIG. 17 is an explanatory diagram showing an example of a configuration of a double-sided grating substrate according to a fifth embodiment.

FIG. 17 is an explanatory diagram showing an example of a configuration of the modulator 102 according to the fifth embodiment.

Although the case where the grating pattern 104 (FIG. 1) of the modulator 102 is formed by, for example, printing or the sputtering method has been described in the first embodiment, the grating pattern corresponding to the grating pattern 104 is constituted of a cylindrical lens 110 in the modulator 102 in FIG. 17. Note that the grating pattern 105 on the back surface side of the grating substrate 102a is similar to that in FIG. 1 of the first embodiment.

In this case, the cylindrical lens 110 is arranged on the front surface of the grating substrate 102a in the modulator 102 so as to form a pattern similar to that of the grating pattern 104 in FIG. 1. The cylindrical lens 110 is a lens formed with a cylindrical surface, and it has a curvature of a convex lens in the vertical direction and no curvature in the horizontal direction.

By forming the grating pattern with the cylindrical lens 110 in this manner, it is possible to greatly reduce the loss of light quantity. For example, when a grating pattern in which shading is given by a printed pattern or the like is used as described in the first embodiment, the printed portion of the grating pattern blocks light, leading to a large loss of light quantity.

In contrast, light is not blocked in the case of the cylindrical lens 110, and it is thus possible to enhance light use efficiency.

As a result, the S/N ratio (Signal-to-Noise ratio) in the imaging apparatus 101 can be increased, and it is thus possible to enhance the drawing performance.

(Sixth Embodiment)

<Configuration Example of Portable Information Terminal>

In a sixth embodiment, a portable information terminal configured by using the imaging apparatus 101 according to the fifth embodiment will be described.

Figure 18:
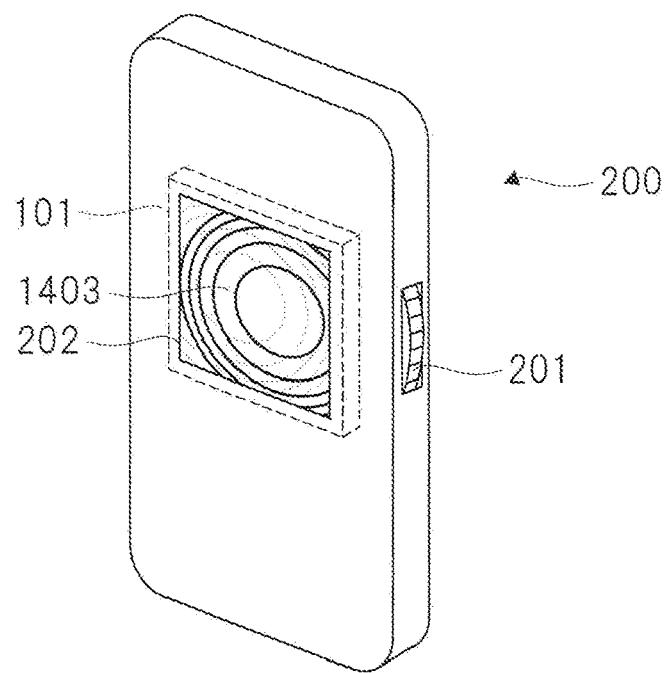
FIG. 18 is an external view showing an example of a portable information terminal according to a sixth embodiment.

FIG. 18 is an external view showing an example of a portable information terminal 200 according to the sixth embodiment.

For example, the portable information terminal 200 is a smartphone or the like. Note that the portable information terminal 200 is not limited to a smartphone, and may be a portable terminal such as a tablet including a built-in camera.

The portable information terminal 200 incorporates the imaging apparatus 101. An aperture window 202 is provided on the back surface of the portable information terminal 200, and the modulator 102 shown in FIG. 16 is provided in the portable information terminal 200 so as to come in proximity to the aperture window 202.

In addition, a focus adjustment knob 201 is provided on a side surface of one long side of the portable information terminal 200. The knob 201 corresponds to the focus position designation input unit 109 in the fourth embodiment.

The focus position is set by turning the knob 201, and an arbitrary grating pattern 1403 is displayed on the liquid crystal layer of the liquid crystal unit 108 in FIG. 16 in accordance with the set focus position. As a result, it is possible to photograph an image of an object at an arbitrary distance.

The imaging apparatus 101 is capable of increasing the effective focal length in accordance with the Expression (14) shown in the first embodiment, and this makes it possible to enlarge an aperture while keeping the imaging apparatus 101 thin.

In the case of a general digital camera for smartphones using a lens, it is inevitable to downsize the aperture of the lens in order to reduce the thickness of the information portable device. Therefore, the focal length becomes short, with the result that the image is flattened and blur cannot be produced in the out-of-focus part of the image.

In contrast, the imaging apparatus 101 is capable of enlarging the aperture as described above, and it is thus possible to produce the aesthetic quality of the blur in the image.

In the manner described above, it is possible to realize the portable information terminal 200 with enhanced drawing performance.

In the foregoing, the invention made by the inventors of the present invention has been concretely described based on the embodiments. However, it is needless to say that the present invention is not limited to the foregoing embodiments and various modifications and alterations can be made within the scope of the present invention.

Note that the present invention is not limited to the embodiments described above, and includes various modification examples. For example, the above embodiments have been described in detail in order to make the present invention easily understood, and the present invention is not necessarily limited to those having all the described configurations.

Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST

101 Imaging apparatus
102 Modulator
102a Grating substrate
103 Image sensor
103a Pixel
104 Grating pattern
105 Grating pattern
106 Image processing circuit
106a Liquid crystal drive circuit
106b Grating pattern generation circuit
106c Intensity modulation circuit
107 Monitor display
108 Liquid crystal unit
109 Focus position designation input unit
110 Cylindrical lens
200 Portable information terminal
201 Knob
202 Aperture window

The invention claimed is:

1. An imaging apparatus comprising:
an image sensor configured to convert an optical image captured by a plurality of pixels arranged in an array on an imaging surface into an image signal and output the image signal;
a modulator provided on a light receiving surface of the image sensor and configured to modulate intensity of light; and
image processing circuitry configured to perform image processing of the image signal output from the image sensor,
wherein the modulator includes:
a transparent material;
a first grating pattern formed on a first surface of the transparent material arranged in proximity to the light receiving surface of the image sensor; and
a second grating pattern formed on a second surface facing the first surface,
each of the pattern and the second grating pattern is constituted of concentric circles,
the modulator performs intensity modulation on light transmitted through the second grating pattern by the pattern and outputs the modulated light to the image sensor, and
a pitch of the concentric circles in each of the pattern and the second grating pattern becomes finer in inverse proportion relative to a reference coordinate serving as a center of the concentric circles.

2. The imaging apparatus according to claim 1, wherein the image processing circuitry calculates a frequency spectrum by performing a two-dimensional Fourier transform on the image signal output from the image sensor.

3. The imaging apparatus according to claim 1, wherein the reference coordinate of the pattern and the reference coordinate of the second grating pattern are different in position.

4. The imaging apparatus according to claim 3, wherein the reference coordinate of the pattern and the reference coordinate of the second grating pattern are shifted from each other in a short side direction of an image output from the image processing circuitry.

5. The imaging apparatus according to claim 1, wherein the second grating pattern is formed of a cylindrical lens.

6. An imaging apparatus comprising:
an image sensor configured to convert an optical image captured by a plurality of pixels arranged in an array on an imaging surface into an image signal and output the image signal;
a modulator provided on a light receiving surface of the image sensor and configured to modulate intensity of light; and
image processing circuitry configured to perform image processing of the image signal output from the image sensor,
wherein the modulator includes:
a transparent material; and
a grating pattern formed on a second surface facing a first surface of the transparent material arranged in proximity to the light receiving surface of the image sensor,
the grating pattern is constituted of a concentric circles,
the image processing circuitry generates a moire fringe image obtained by adding moire to the image signal output from the image sensor, and
a pitch of the concentric circles in the grating pattern becomes finer in inverse proportion relative to a reference coordinate serving as a center of the concentric circles.

7. The imaging apparatus according to claim 6, wherein the image processing circuitry calculates a frequency spectrum by performing two-dimensional Fourier transform on the generated moire fringe image.

8. The imaging apparatus according to claim 6, wherein the grating pattern is formed of a cylindrical lens.

9. An imaging apparatus comprising:
an image sensor configured to convert an optical image captured by a plurality of pixels arranged in an array on an imaging surface into an image signal and output the image signal;
a modulator configured to modulate intensity of light; and
image processing circuitry configured to perform image processing of the image signal output from the image sensor,
wherein the modulator includes a display that is transparent and displays a first concentric pattern,
the image sensor captures the optical image transmitted through the display displaying the first concentric pattern,
the image processing circuitry processes a moire fringe image generated by the first concentric pattern displayed on the display and a second concentric pattern different from the first concentric pattern to generate an image,
the display displays the first concentric pattern under control of the image processing circuitry, and
a pitch of the first concentric pattern becomes finer in inverse proportion relative to a reference coordinate serving as a center of the first concentric pattern.

10. The imaging apparatus according to claim 9, wherein the reference coordinate of the first concentric pattern displayed by the display and a reference coordinate serving as a center of the second concentric pattern are different in position.

11. The imaging apparatus according to claim 9, further comprising:
an input interface configured to input information to designate a focus position of a subject,
wherein the image processing circuitry changes a shape of the first concentric pattern displayed by the display based on focus position information designated by the input interface.

12. The imaging apparatus according to claim 8, wherein the image processing circuitry calculates a frequency spectrum by performing a two-dimensional Fourier transform on the image signal output from the image sensor.

13. The imaging apparatus according to claim 6, further comprising:
an input interface configured to input information to designate a focus position of a subject,
wherein the image processing circuitry changes a shape of the concentric circles based on focus position information designated by the input interface.

* * * * *